Nov. 15, 1938.  B. H. SAVAGE  2,136,396
AUTOMATIC PISTOL
Filed Sept. 19, 1934  4 Sheets-Sheet 1
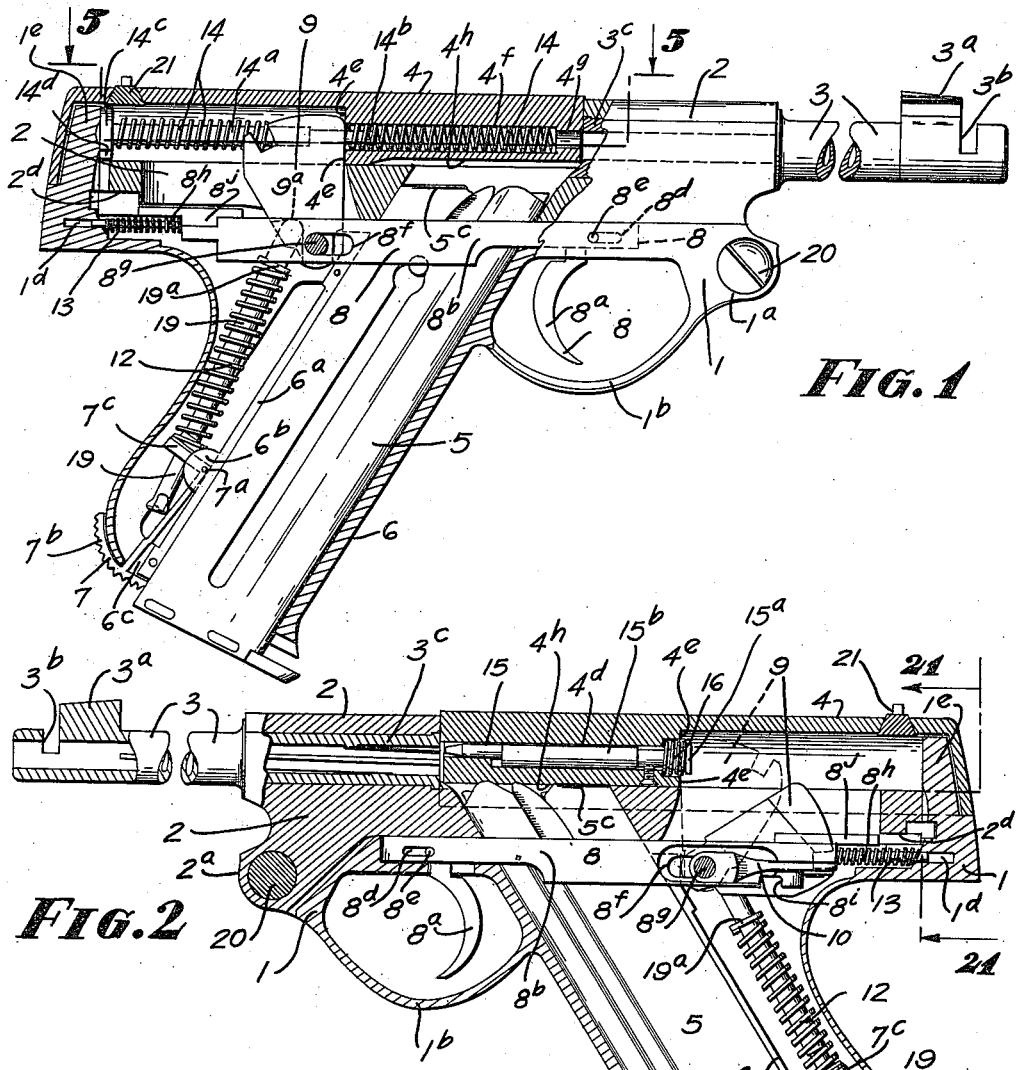
INVENTOR.
Basil H. Savage
BY A. B. Bowman
ATTORNEY Nov. 15, 1938.　　B. H. SAVAGE　　2,136,396

AUTOMATIC PISTOL

Filed Sept. 19, 1934　　4 Sheets-Sheet 2

INVENTOR.
Basil H. Savage
BY A.B.Bowman
ATTORNEY

Nov. 15, 1938.   B. H. SAVAGE   2,136,396
AUTOMATIC PISTOL
Filed Sept. 19, 1934   4 Sheets-Sheet 3

INVENTOR.
Basil H. Savage
BY A.B.Bowman
ATTORNEY

Nov. 15, 1938.   B. H. SAVAGE   2,136,396
AUTOMATIC PISTOL
Filed Sept. 19, 1934   4 Sheets—Sheet 4

INVENTOR.
Basil H. Savage
BY
A. B. Bowman
ATTORNEY

Patented Nov. 15, 1938

2,136,396

UNITED STATES PATENT OFFICE 2,136,396

AUTOMATIC PISTOL

Basil H. Savage, San Diego, Calif., assignor to Savage Research Corporation, San Diego, Calif.

Application September 19, 1934, Serial No. 744,682

8 Claims. (Cl. 42—75)

My invention relates to an automatic pistol, and the objects of my invention are:

First, to provide an automatic pistol in which the recoil spring serves also as an ejector spring thus simplifying the pistol construction;

Second, to provide an automatic pistol of this class that is so constructed that it will not fire until in closed spaced position;

Third, to provide an automatic pistol of this class in which the hammer spring serves also as magazine latch spring thus simplifying the construction;

Fourth, to provide an automatic pistol of this class in which there is an automatic sear in connection with the trigger member;

Fifth, to provide an automatic pistol of this class with means in connection with the muzzle of the barrel to compensate for pressure on the upper side to prevent kicking up of the muzzle and of the barrel;

Sixth, to provide an automatic pistol of this class with a safety means on the outside to the latch bolt; and Seventh, to provide an automatic pistol of this class which is very simple and economical of construction, easy to operate, efficient in its action, and which will not readily deteriorate or get out of order.

Figure 5:
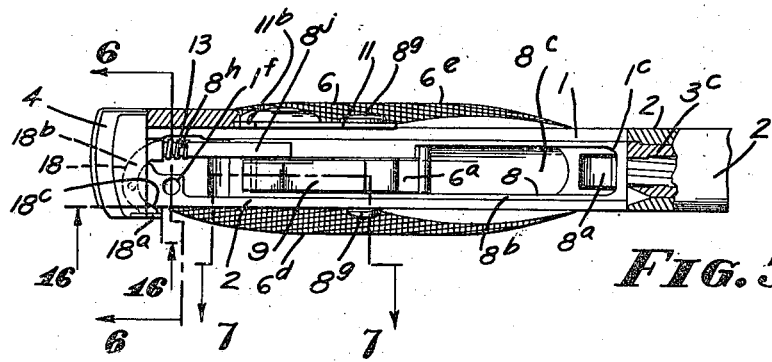
Figure 6:
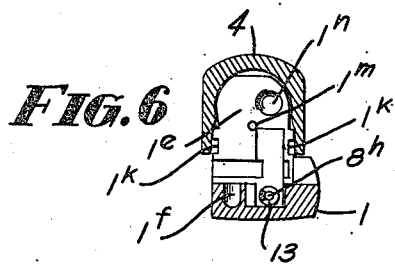
Figure 7:
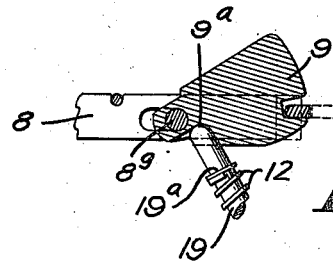
Figure 8:
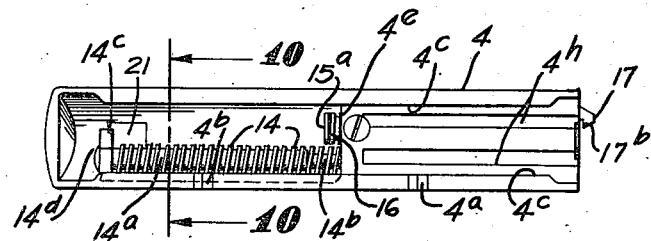
Figure 9:
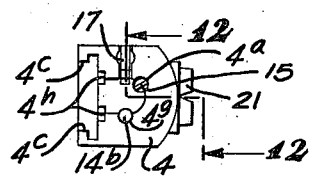
Figure 10:
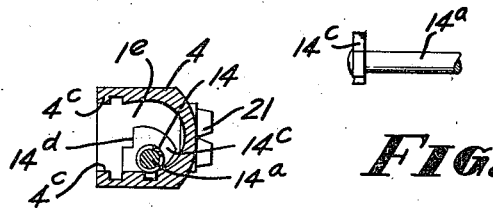
Figure 11:
Figure 12:
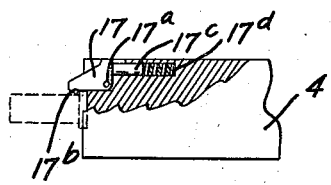
Figure 13:
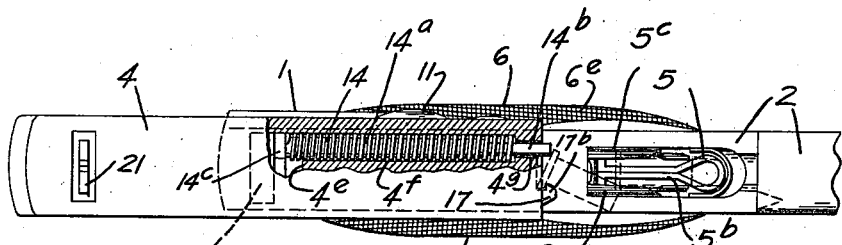
Figure 14:
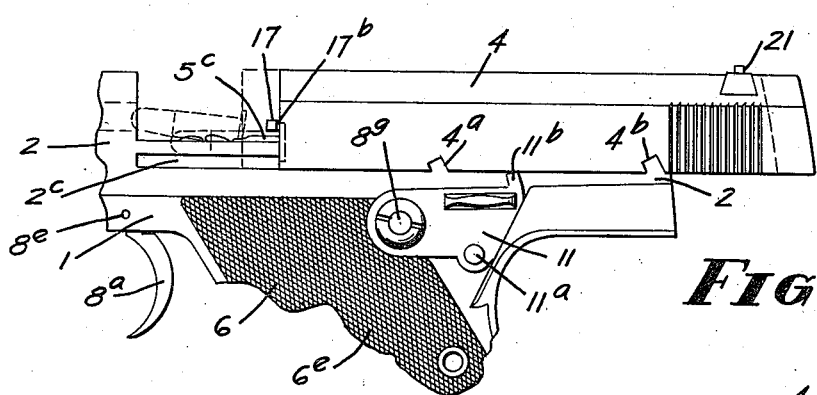
Figure 15:
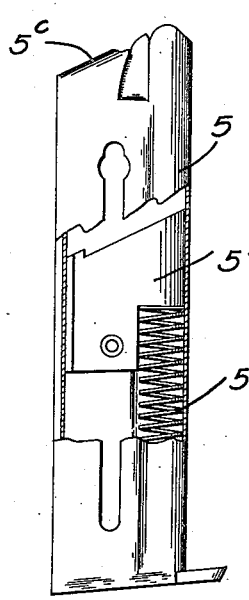
Figure 16:
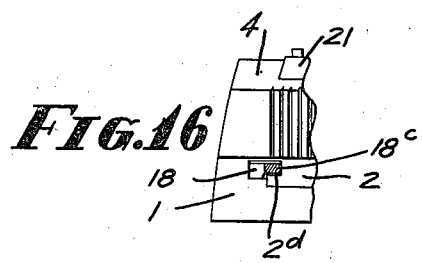
Figure 17:
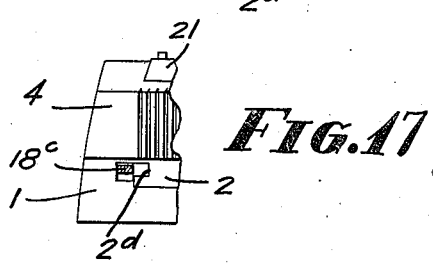
Figure 18:
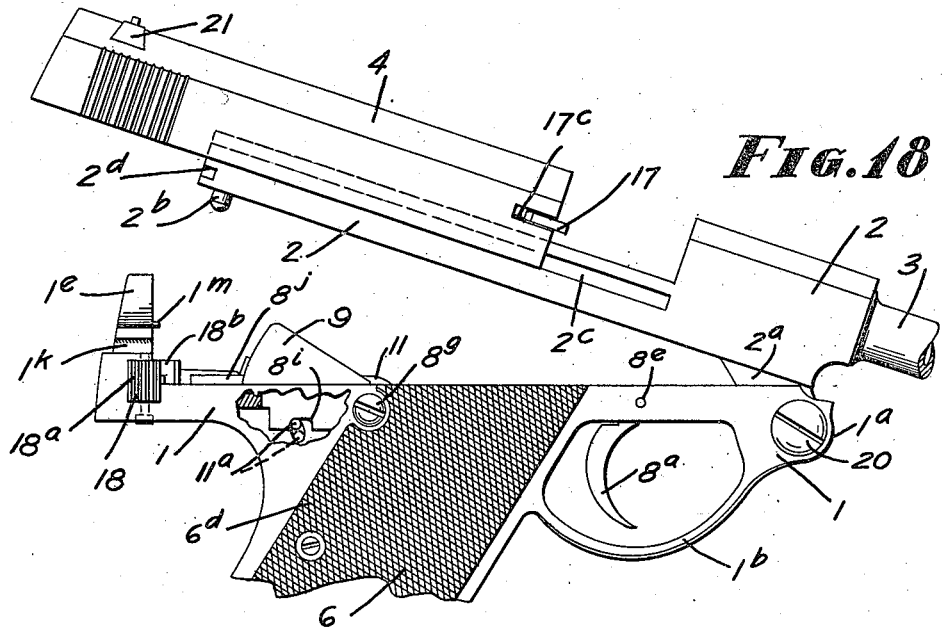
Figure 21:
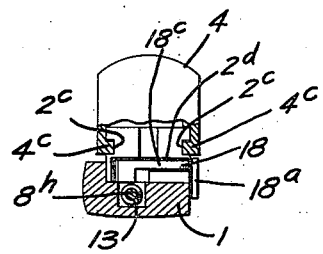
Figure 19:
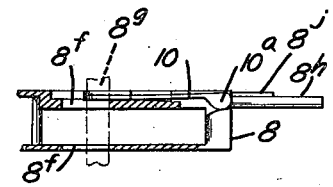
Figure 20:
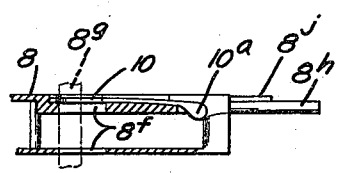

With these and other objects in view as will appear hereinafter, my invention consists of certain novel features of construction, combination and arrangement of parts and portions as will be hereinafter described in detail and particularly set forth in the appended claims, reference being had to the accompanying drawings and to the characters of reference thereon which form a part of this application, in which:

Figure 1 is a fragmentary side elevational view of the pistol showing portions broken away and in section longitudinally at the middle portion thereof; Fig. 2 is a longitudinal sectional view through the middle from the opposite side from that of Fig. 1 of the drawings; Fig. 3 is a detailed side elevational view of the trigger member together with the sear in its relation thereto, and Fig. 4 a top or plan view thereof; Fig. 5 is a fragmentary longitudinal sectional view through 5—5 of Fig. 1; Fig. 6 is a transverse sectional view of the handle end of the pistol along the line 6—6 of Fig. 5; Fig. 7 is a fragmentary longitudinal sectional view along the line 7—7 of Fig. 5; Fig. 8 is a view from the lower side of the slide member of said automatic pistol; Fig. 9 is an end view thereof; Fig. 10 is a sectional view through 10—10 of Fig. 8; Fig. 11 is a fragmentary detailed view of the retractor member; Fig. 12 is a fragmentary view of the slide member showing the cartridge extractor positioned therein in solid lines and showing the cartridge by dotted lines after being extracted and held by the extractor member taken substantially through the line 12—12 of Fig. 9; Fig. 13 is a top or plan view of a fragmentary portion of the pistol showing slide shifted backwardly and showing a portion broken away and in section to show the retractor pin and spring and showing the shell in the process of being extracted and thrown out; Fig. 14 is a fragmentary side elevational view of the pistol showing the slide in its backward position and showing the shell extracted and ready to be thrown out shown in dotted lines; Fig. 15 is a side elevational view of the magazine showing portions broken away and in section to facilitate the illustration; Fig. 16 is a sectional view from the line 16—16 of Fig. 5 showing the breaking catch in latching position; Fig. 17 is a similar view showing the breaking catch in unlatched position; Fig. 18 is a fragmentary side elevational view of my automatic pistol shown broken open and the slide member positioned partially back from operating position; Fig. 19 is a fragmentary sectional view through 19—19 of Fig. 3 showing the sear in position for operating the hammer; Fig. 20 is a similar view showing the sear in position so that the hammer is inoperative, and Fig. 21 is a fragmentary sectional view along the line 21—21 of Fig. 2 of the drawings.

Similar characters of reference refer to similar parts and portions throughout the several views of the drawings.

Frame member 1, frame member 2, barrel 3, slide member 4, cartridge magazine 5, handle member 6, magazine catch 7, trigger member 8, hammer 9, sear 10, safety latch member 11, main spring 12, trigger spring 13, retractor spring 14, firing pin 15, firing pin spring 16, cartridge extractor 17, breaking catch 18, hammer bolt 19, pivot bolt 20 and sight 21, constitute the principal parts and portions of my automatic pistol.

The frame member 1 is the supporting frame portion of the pistol and is integrally connected with the handle member 6. It is provided at its front end with a bifurcated lug portion 1a which extends on opposite sides of the lug portion 2a of the member 2 and mounted through these members 1a and 2a is a bolt member 20 which provides a pivot for the frame members 1 and 2, thus providing means for pivotal connection of the frame members 1 and 2 at the front portion of the frame member 1. This frame member is also provided with a trigger guard 1b which extends around the trigger portion 8a of the trigger member 8, as shown best in Figs. 1 and 2 of the drawings. Extending downwardly and backwardly from the main horizontal portion of the frame member 1 is the handle member 6 which is hollow and shaped so as to receive the cartridge magazine 5, as shown best in Fig. 1 of the drawings. However, it will be noted that the cartridge magazine is not fully positioned inwardly in the handle member in Fig. 1 of the drawings. At the back side of the cartridge magazine 5 in the handle member 6 is a partition plate 6a which forms the back side of the cartridge magazine recess. This plate 6a is provided with backwardly extending lugs 6b on opposite sides of the plate 6a between which is pivotally mounted the magazine catch 7 by means of a pin 7a. One portion of the member 7 extends from this pin 7a downwardly and out through a slot 6c in the handle member 6 and is provided on its end with a curved member 7b which is knurled at its outer side to facilitate its movement. This member 7b extends forwardly and is adapted to engage the lower end of the cartridge magazine 5 and hold it in its proper position.

The member 7 is in bellcrank form and therefore is provided with a rightangled portion 7c which serves as a support for the hammer bolt 19 and hammer bolt spring 12, as shown best in Figs. 1 and 2 of the drawings. The hammer bolt 19 is provided with a collar 19a and the spring 12 is positioned between the collar 19a and the member 7c and tends to force the hammer bolt 19 upwardly at all times and to force the member 7c and therefore the catch member 7 into engagement with the cartridge magazine in the position shown best in Fig. 2 of the drawings. The upper end of this hammer bolt member 19 is rounded and adapted to fit into a recess 9a in the hammer member 9, as shown best in Fig. 7 of the drawings, when the hammer is in its backward position, and shown by dotted lines in Fig. 1 of the drawings when the hammer is in its forward position.

The handle member 6 is provided on opposite sides with hand grip members 6d and 6e for enclosing the sides thereof.

The cartridge magazine is of the conventional form and is shaped as shown best in Fig. 15 of the drawings. It is provided with a spring 5a therein tending to force the cartridges upwardly in said magazine which cartridges are supported on the supporting member 5b in superposed relation and the upper member is provided with spring portions 5c tending to hold the cartridges in their proper position as they are automatically moved upwardly by the spring 5a as required for use.

The frame member 1 is provided with a longitudinal recess 1c in its upper side in which is adapted to reciprocate the trigger member 8, which trigger member is shown best in Figs. 3 and 4 of the drawings and consists of a frame 8b which is provided with a long slot 8c which is adapted to permit the upper end of the cartridge magazine 5 to pass through the trigger member 8. It is provided at its front end with a downwardly depending trigger 8a which is rigidly secured thereto so that with the movement of the trigger 8a the trigger member 8 is reciprocated in the frame member 1. This trigger member 8 is provided with a slot 8d at its forward end in which is mounted a pin 8e which extends into the frame on opposite sides and limits the movement of the trigger member 8 longitudinally in the recess in the frame. This trigger member 8 is also provided with another slot 8f through which passes a bolt 8g which extends into the frame member 1 at opposite sides of the trigger member 8 and also serves as the pivotal support for the hammer member 9. The bolt 8g also serves to support the sear member 10 which is provided with an extended portion 10a, shown best in Figs. 19 and 20 of the drawings, which is adapted to extend into a notch in the hammer member 9 and prevent its movement with the shifting of the trigger member in case the pistol is not in closed operating position. This is shown best in Figs. 19 and 20 of the drawings.

The trigger member 8 is provided with a backwardly extending spring centering member 8h which extends backwardly into a hole 1d and a spring 13 is positioned thereon which tends to force the trigger member 8 forwardly at all times.

This trigger member 8 is also provided with a slot 8i in its lower side, as shown best in Fig. 3 of the drawings, which is adapted to receive an inwardly extending pin 11a in the safety latch member 11 when said latch member is in its upward position, said latch member being shown best in Fig. 14 of the drawings, thus preventing movement of the trigger member 8 when the latch member 11 is in its upward position. This latch member 11 is also pivoted upon the bolt 8g and is provided with a detent portion 11b which is adapted to engage notches 4a and 4b respectively in the slide member 4, all as shown best in Fig. 14 of the drawings, for holding the slide member in certain position when desired.

The frame member 1 is also provided with an upwardly extending head portion 1e at its rear end in the lower side of which is pivotally mounted the breaking catch member 18 which is provided with an outwardly extending knurled portion 18a and with an inwardly extended forwardly turned portion 18b which is adapted to engage the lug 8j on the trigger member 8 and prevent the trigger member from coming backwardly when the breaking catch is released so that the pistol may be broken, all as shown best in Fig. 5 of the drawings.

The frame member 1 is also provided with a centering recess 1f which is adapted to receive a lug 2b depending from the rear end of the frame member 2.

The frame member 2 is pivotally mounted relatively to the frame member 1 as heretofore stated by means of the bolt 20 through the lug 2a of the member 2 thus providing means for breaking the members 1 and 2. The frame member 2 is provided at its front end with the barrel 3 which is the conventional rifle barrel. It is provided near its front end at the upper side with a sighter member 3a and just in front of the sight member and slightly back of the muzzle end of the barrel is a slot 3b which extends downwardly into the barrel some distance. This slot is for the purpose of providing a means to compensate for the pressure on the upper side of the barrel to prevent the kick-up of the muzzle end of the pistol. It will be noted that the back end of the barrel 3c is rigidly secured in position in the front portion of the member 2. This frame member then extends backwardly in reduced height and is provided in opposite sides with slots 2c which aline with slots 1k in the member 1, as shown best in Fig. 18 of the drawings.

The frame member 2 is also provided with a notch 2d in its rear end upwardly from the lower side and adjacent the lug 2b which is adapted to receive the portion 18c of the member 18 when the knurled portion is in its forward position for holding the members 1 and 2 in closed relation to each other.

Shiftably mounted longitudinally on the frame members 1 and 2 and supported thereon by means of inwardly extending rib members 4c on the member 4 engaging the slots 2c of the member 2 and 1k of the member 1 is the slide member 4. This slide member 4 is adapted to reciprocate backwardly and forwardly with the operation of the pistol. This slide member 4 is provided with a bore 4d in which is reciprocally mounted the firing pin 15, shown best in Fig. 2 of the drawings.

This firing pin 15 is provided with a head 15a which is adapted to be engaged by the hammer 9 when released by the trigger member 8 and between the head 15a and a shoulder 4e in the member 4 is interposed a spring 16 tending to hold the firing pin backwardly. The other end of the firing pin 15 is provided with a tapered end which is adapted to engage the cartridge when firing the pistol. This firing pin is provided with an enlarged portion 15b intermediate its ends which serves as a stop to limit the reciprocal movement of the firing pin 15 which engages a shoulder in the member 4 at one end and a screw in the member 4 at the opposite end. This member 4 is also provided with another bore 4f in which is mounted the retractor and recoil spring 14. This spring 14 surrounds an ejector member 14a which is in the form of a pin mounted inside of the coil spring 14 and is provided with a reduced portion 14b which is adapted to pass into and through the reduced portion 4g of the bore 4f and engage the side of the cartridge for ejecting the same when the slide member 4 is in its backward position caused by the recoil from the explosion of the cartridge in firing. This pin 14a is provided with a head member 14c at its rear end which is shaped as shown best in Figs. 10 and 11 of the drawings, which is provided with a notch 14d in the member 14c which provides a shoulder for engagement with the lug 1m for supporting the free end of the member 14a laterally. This free end is also provided with a rounded portion which engages a rounded recess 1n in the member 1, shown best in Fig. 6 of the drawings. The shoulder 4e is adapted to engage the hammer for moving it backwardly with the backward movement of the slide member 4 for positioning it in the position shown by solid lines in Fig. 2 of the drawings ready for firing again.

Mounted in the forward end of the member 4 pivoted on the pin 17a is the cartridge extractor member 17 which is provided with a hook portion 17b which is adapted to engage the forward side of the rim of the cartridge, as shown best in Fig. 12 of the drawings, for drawing the exploded cartridge backwardly with the backward movement of the member 4, and it is supported in its engaging relation by means of a pin 17c backed by a spring 17d both of which are in a recess in the member 4, all shown best in Fig. 12 of the drawings.

The slide member 4 is also provided with a pair of grooves 4h into which the upper edge 5c of the cartridge magazine extends when inserted in position.

This member 4 is also provided near its back end at its upper side with a sight member 21 which extends upwardly above the upper surface of said member 4 which sight member is of the conventional form.

The operation of my automatic pistol is as follows: The magazine 5 is inserted in position as shown in Fig. 2 of the drawings, and while it is being inserted the catch member 7 is moved backwardly, as shown in Fig. 1 of the drawings, slightly compressing the spring 12. When the magazine is fully inserted the member 7 is forced backwardly by the spring 12 to the position shown in Fig. 2 of the drawings, thus providing means for supporting the magazine rigidly in position. Thus it will be noted that this spring 12 serves both for operating the catch 7 and for operating the hammer bolt 19. It will be noted that the uppermost cartridge in the magazine rests on the ridge between the grooves 4h, shown best in Fig. 8 of the drawings. The slide member 4 is now drawn once to the rear by hand, thereby cocking the hammer 9. In this position of the slide member the magazine spring 5a raises the topmost cartridge so as to bring it into the path of the slide 4 and upon releasing the slide it is carried with the slide by the retractor spring and during this movement the slide forces the topmost cartridge into the barrel 3. As the slide approaches its forward position the front of the slide encounters the rear end of the barrel and forces the cartridge in position and the pistol is ready for firing.

A slight pull on the trigger now serves to move the sear so as to release the hammer and fire the shot. The force of the powder gases driving the bullet from the barrel is exerted rearwardly against the slide overcoming the inertia of the slide and the tension of the retractor spring causes the slide to move backwardly. After moving backwardly for a distance far enough to insure the bullet having passed from the barrel its momentum causes it to continue its rearward movement thereby again cocking the hammer and compressing the retractor spring until as the slide arrives at its rearmost position the empty shell is ejected from the side of the pistol and another cartridge raised in front of the slide. During the return or forward movement of the slide caused by the retractor spring the cartridge is driven into the barrel thus making the pistol ready for another shot. These operations may be continued so long as there are cartridges in the magazine, each discharge requiring only the slight pull on the trigger.

It will be noted that in applicant's structure the retractor spring 14 serves as a retractor as well as an ejector of the spent cartridge; that the pistol is so constructed that it will not fire until in closed, locked and spaced position; that the hammer spring also serves for the magazine catch spring.

Though I have shown and described a particular construction, combination and arrangement of parts and portions, I do not wish to be limited to this particular construction, combination and arrangement but desire to include in the scope of my invention the construction, combination and arrangement substantially as set forth in the appended claims.

Having thus described my invention, what I claim as new and desire to secure by Letters Patent is:

1. In an automatic pistol, a frame member provided with a handle, another frame member pivotally connected thereto at the normally front end of said first mentioned frame member intermediate the ends of said second mentioned frame member, said second mentioned frame member provided with a barrel extending forwardly of the pivotal mounting, a trigger member slidably mounted in said first mentioned frame member, and a latch mounted in said first mentioned frame member adapted to engage a notch in the second mentioned frame member when shifted to a certain position and provided with an extended portion adapted to engage said trigger member to prevent its sliding when said latch member is out of engagement with said notch, whereby the trigger member cannot be operated when the two frame members are in inoperative position.

2. In an automatic pistol, the combination of a frame member provided with a handle, another frame member pivotally connected thereto at the normally front end of said first mentioned frame member intermediate the ends of said second mentioned frame member, said second mentioned frame member provided with a barrel extending forwardly of the pivotal mounting, a trigger member slidably mounted in said first mentioned frame member, a latch mounted in said first mentioned frame member adapted to engage a notch in the second mentioned frame member when shifted to a certain position and provided with an extended portion adapted to engage said trigger member to prevent its sliding when said latch member is out of engagement with said notch, whereby the trigger member cannot be operated when the two frame members are in inoperative position, and a hammer member mounted in said first mentioned frame member adapted to operate in a slot in said second mentioned frame member and be released by said trigger member.

3. In an automatic pistol, the combination of a frame member provided with a handle, another frame member pivotally connected thereto at the normally front end of said first mentioned frame member intermediate the ends of said second mentioned frame member, said second mentioned frame member provided with a barrel extending forwardly of the pivotal mounting, a trigger member slidably mounted in said first mentioned frame member, a latch mounted in said first mentioned frame member adapted to engage a notch in the second mentioned frame member when shifted to a certain position and provided with an extended portion adapted to engage said trigger member to prevent its sliding when said latch member is out of engagement with said notch, whereby the trigger member cannot be operated when the two frame members are in inoperative position, a hammer member mounted in said first mentioned frame member adapted to operate in a slot in said second mentioned frame member and be released by said trigger member, and a slide member longitudinally shiftable on both of said frame members.

4. In an automatic pistol, a combination of a frame member provided with a handle, another frame member pivotally connected thereto at the normally front end of said first mentioned frame member intermediate the ends of said second mentioned frame member, said second mentioned frame member provided with a barrel extending forwardly of the pivotal mounting, a trigger member slidably mounted in said first mentioned frame member, a latch mounted in said first mentioned frame member adapted to engage a notch in the second mentioned frame member when shifted to a certain position and provided with an extended portion adapted to engage said trigger member to prevent its sliding when said latch member is out of engagement with said notch, whereby the trigger member cannot be operated when the two frame members are in inoperative position, a hammer member mounted in said first mentioned frame member adapted to operate in a slot in said second mentioned frame member and be released by said trigger member, a slide member longitudinally shiftable on both of said frame members, and a firing pin reciprocally mounted in said slide member adapted to be engaged by said hammer member when released.

5. In an automatic pistol, a combination of a frame member provided with a handle, another frame member pivotally connected thereto at the normally front end of said first mentioned frame member intermediate the ends of said second mentioned frame member, said second mentioned frame member provided with a barrel extending forwardly of the pivotal mounting, a trigger member slidably mounted in said first mentioned frame member, a latch mounted in said first mentioned frame member adapted to engage a notch in the second mentioned frame member when shifted to a certain position and provided with an extended portion adapted to engage said trigger member to prevent its sliding when said latch member is out of engagement with said notch, whereby the trigger member cannot be operated when the two frame members are in inoperative position, a hammer member mounted in said first mentioned frame member adapted to operate in a slot in said second mentioned frame member and be released by said trigger member, a slide member longitudinally shiftable on both of said frame members, a firing pin reciprocally mounted in said slide member adapted to be engaged by said hammer member when released, and spring means in connection with said firing pin adapted to force said firing pin backwardly when disengaged by said hammer.

6. In an automatic pistol, a combination of a frame member provided with a handle, another frame member pivotally connected thereto at the normally front end of said first mentioned frame member intermediate the ends of said second mentioned frame member, said second mentioned frame member provided with a barrel extending forwardly of the pivotal mounting, a trigger member slidably mounted in said first mentioned frame member, a latch mounted in said first mentioned frame member adapted to engage a notch in the second mentioned frame member when shifted to a certain position and provided with an extended portion adapted to engage said trigger member to prevent its sliding when said latch member is out of engagement with said notch, whereby the trigger member cannot be operated when the two frame members are in inoperative position, a hammer member mounted in said first mentioned frame member adapted to operate in a slot in said second mentioned frame member and be released by said trigger member, a slide member longitudinally shiftable on both of said frame members, a firing pin reciprocally mounted in said slide member adapted to be engaged by said hammer member when released, spring means in connection with said firing pin adapted to force said firing pin backwardly when disengaged by said hammer, and a retractor spring mounted in said slide member in engagement with said first mentioned frame member tending to force said slide member forwardly on said second mentioned frame member.

7. In an automatic pistol, a handle supporting frame member, a barrel supporting frame member pivotally connected thereto, a trigger slidably mounted in said handle supporting frame member, a latch member in said handle supporting frame member engageable with said barrel supporting frame member for holding said frame members in interlocked relation and provided with means on said latch for engagement with said trigger member when in its unlatched position to prevent the backward sliding movement of said trigger when said frame members are in unlatched condition.

8. In an automatic pistol, a handle supporting frame member, a barrel supporting frame member pivotally connected thereto, a trigger slidably mounted in said handle supporting frame member, a latch member in said handle supporting frame member engageable with said barrel supporting frame member for holding said frame members in interlocked relation and provided with means on said latch for engagement with said trigger member when in its unlatched position to prevent the backward sliding movement of said trigger when said frame members are in unlatched condition, and spring means in connection with said trigger member in the back portion of said handle supporting frame tending to hold it forwardly in said handle supporting frame member.

BASIL H. SAVAGE.